Figure 1:
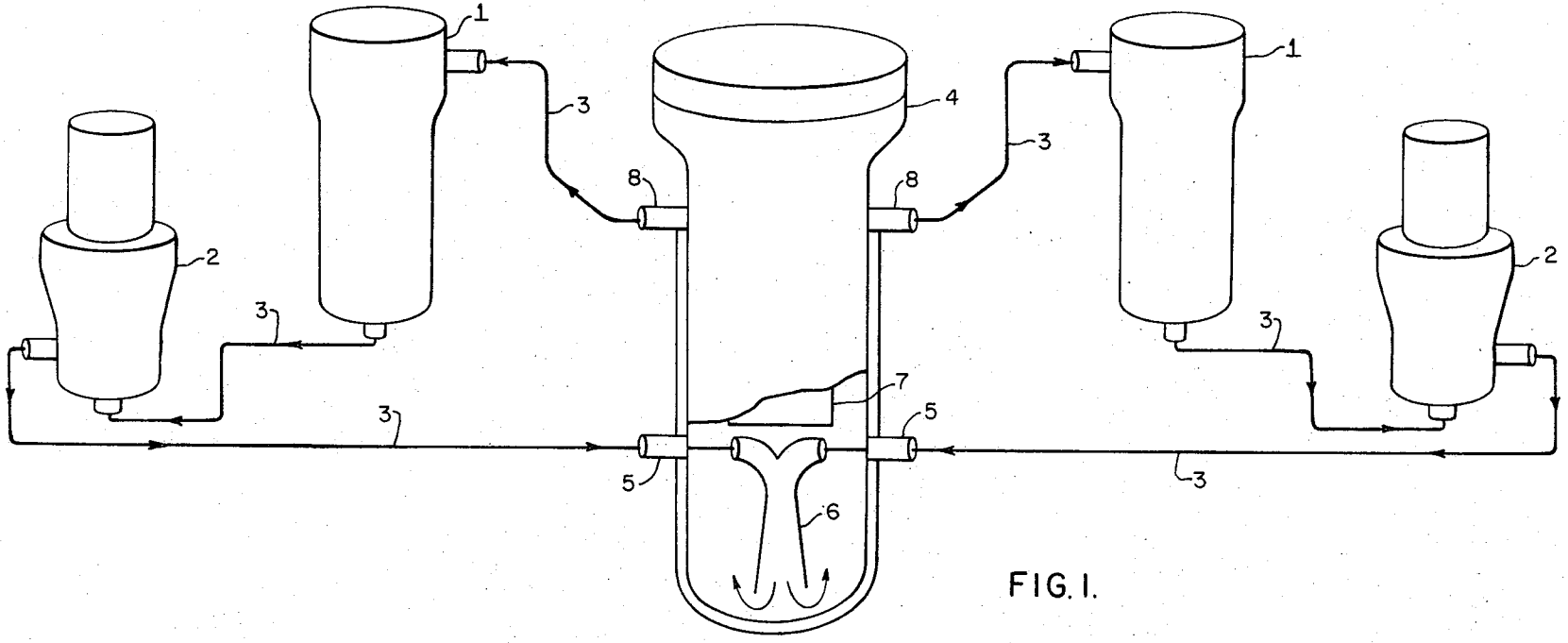
Figure 2:
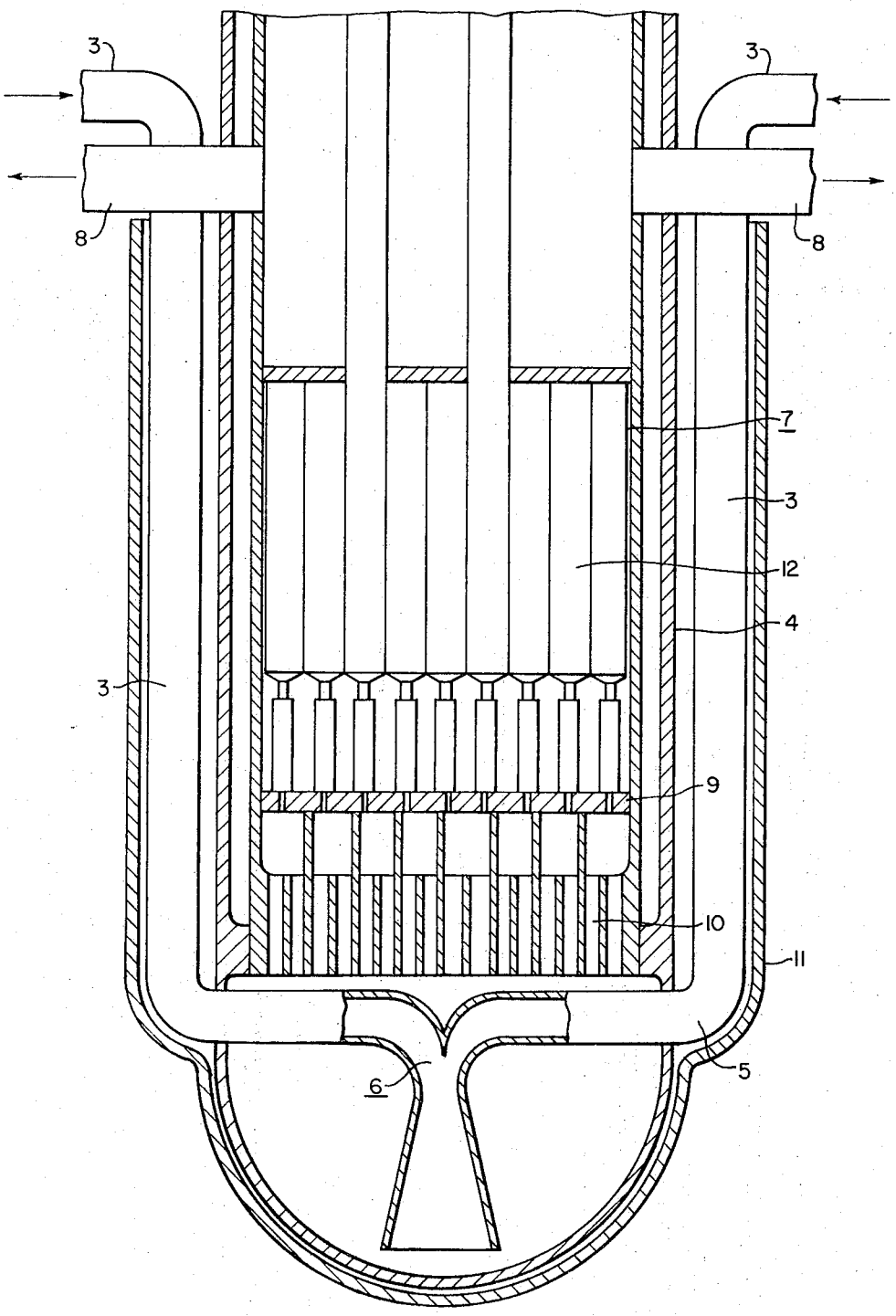
Figure 3A:
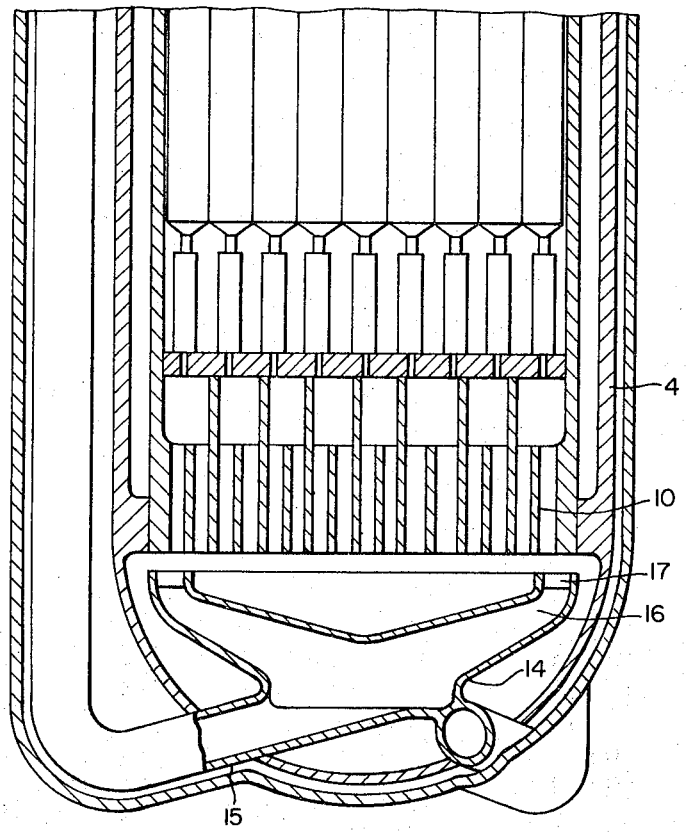
Figure 3B:
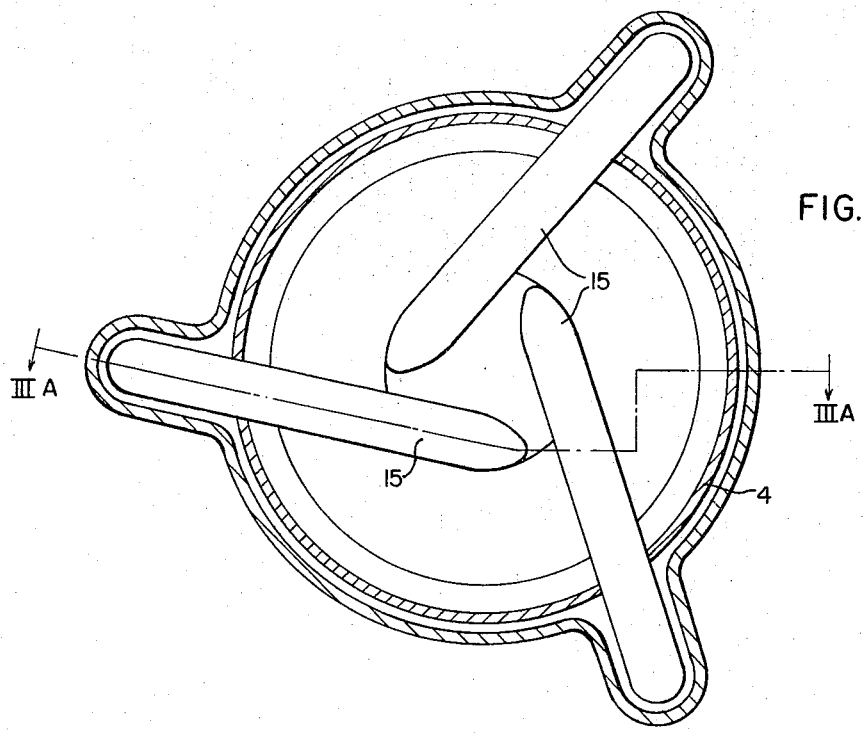
Figure 4:
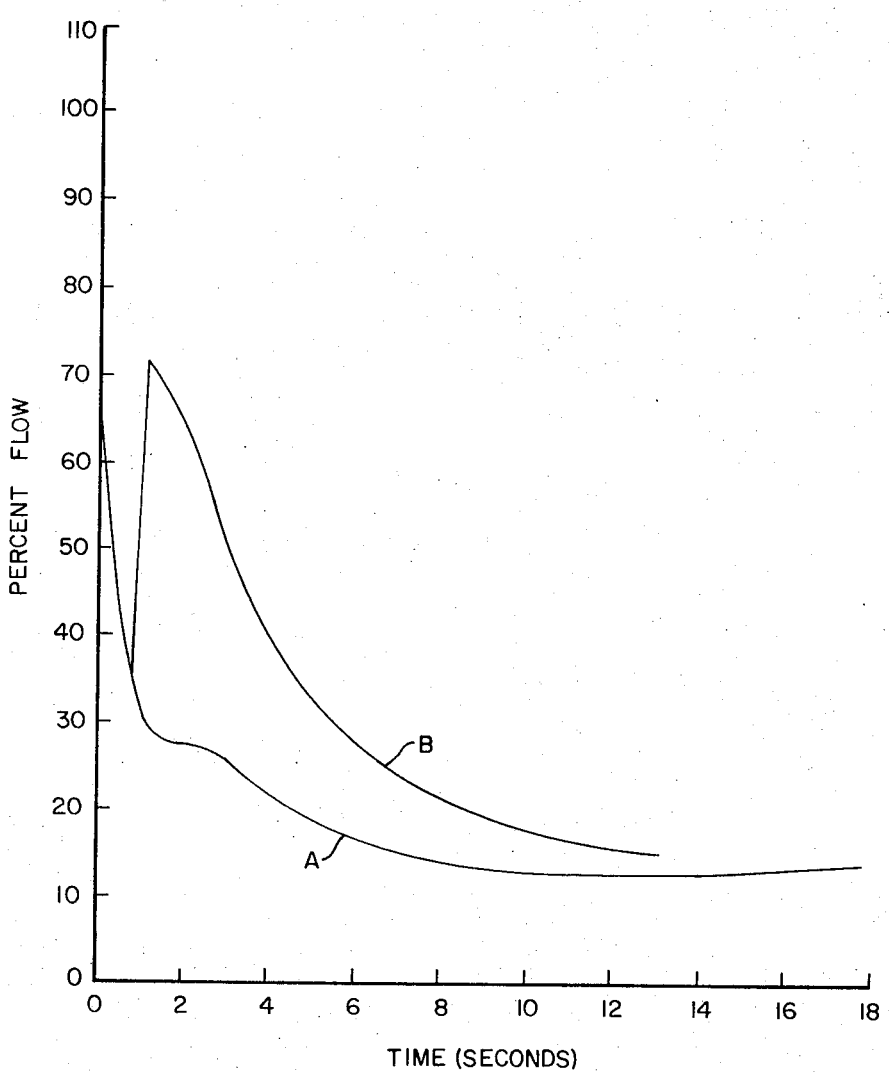
Figure 5A:
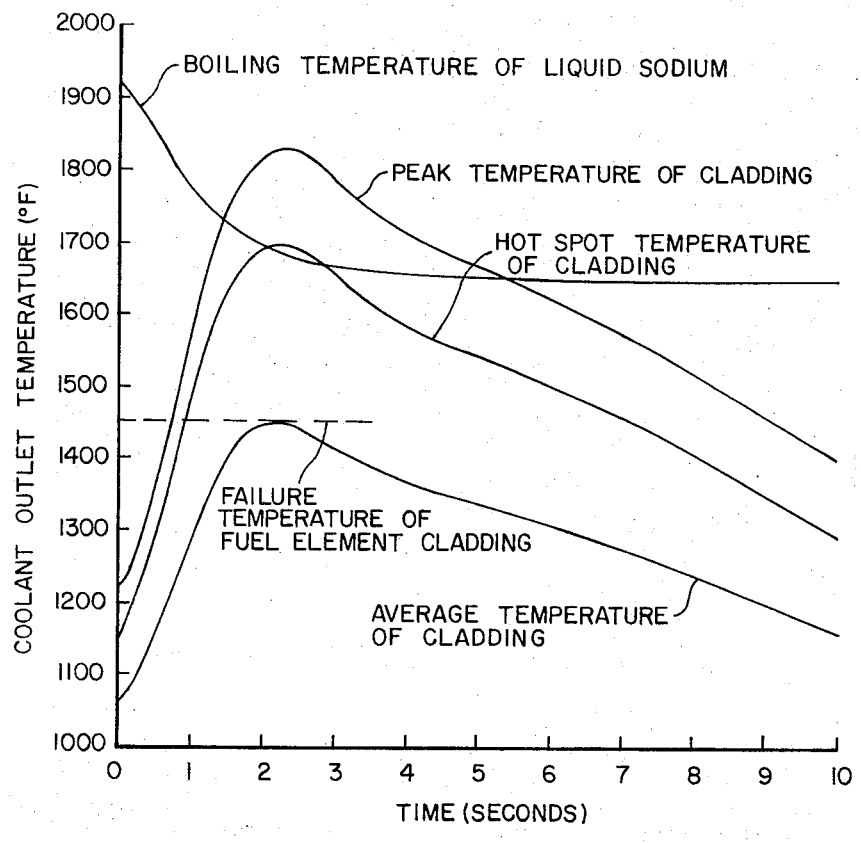
Figure 5B:
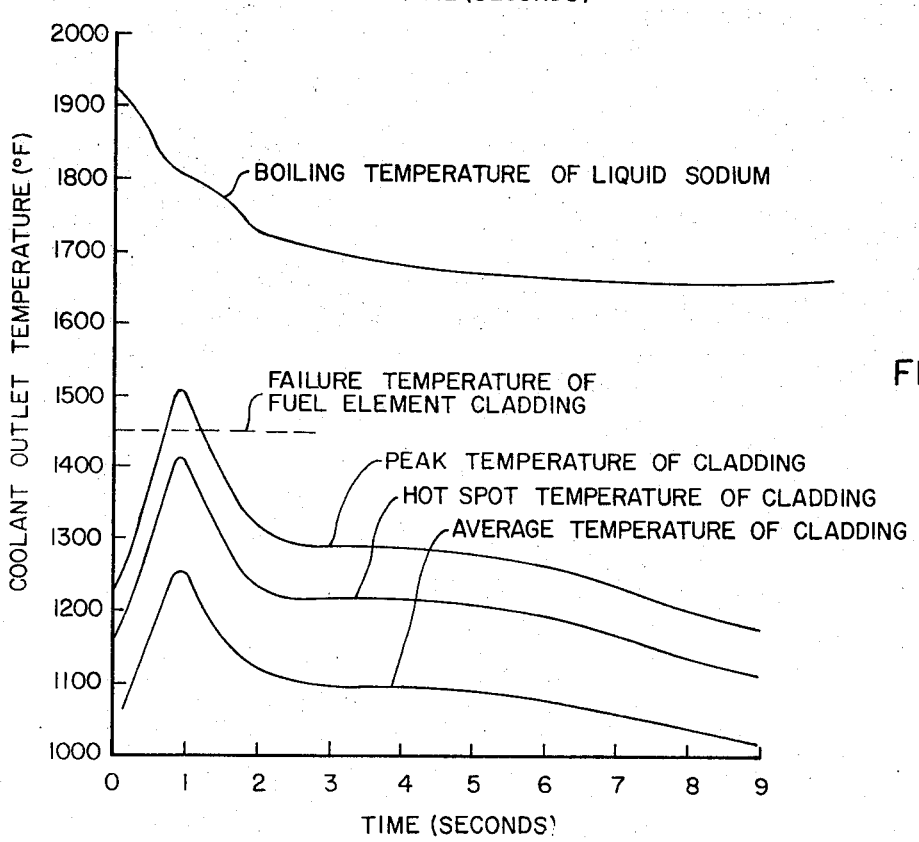

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 867

T921,015
NUCLEAR REACTOR CORE COOLING ARRANGEMENT

Arnold H. Redding, Export, Pa., assignor to Westinghouse Electric Corporation, Pittsburgh, Pa.

Filed Sept. 13, 1972, Ser. No. 288,610
Int. Cl. G21c *15/18, 15/24*
U.S. Cl. 176—38
5 Sheets Drawing. 15 Pages Specification

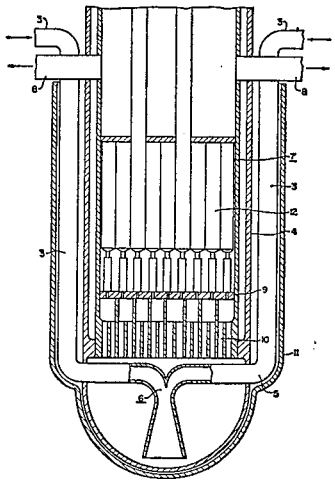

A core cooling system for a nuclear reactor having a plurality of primary fluid flow systems. The reactor coolant flow from the primary systems is joined upon entering the pressure vessel. Jointure is accomplished in a common chamber causing high coolant flow velocities at low static pressures. If a pipe ruptures in one of the primary fluid flow systems, the low pressure in the common chamber minimizes leakage from the intact flow systems. This allows continuation of coolant flow through the nuclear core for a sufficient length of time to effectively eliminate the possibility of thermal damage.

NUCLEAR REACTOR CORE COOLING ARRANGEMENT

Filed Sept. 13, 1972 5 Sheets-Sheet 1

NUCLEAR REACTOR CORE COOLING ARRANGEMENT

Filed Sept. 13, 1972 5 Sheets-Sheet 2

NUCLEAR REACTOR CORE COOLING ARRANGEMENT

Filed Sept. 13, 1972 5 Sheets-Sheet 3

NUCLEAR REACTOR CORE COOLING ARRANGEMENT

Filed Sept. 13, 1972 5 Sheets-Sheet 4

NUCLEAR REACTOR CORE COOLING ARRANGEMENT

Filed Sept. 13, 1972 5 Sheets-Sheet 5